(12) United States Patent  
Klostermeier

(10) Patent No.: US 6,304,043 B1  
(45) Date of Patent: Oct. 16, 2001

(54) CIRCUIT ARRANGEMENT FOR SIGNAL COUPLING BETWEEN CIRCUIT PARTS HAVING SUPPLY LINES ISOLATED FROM ONE ANOTHER

(75) Inventor: Dieter Klostermeier, Villingen-Schwenningen (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/608,327

(22) Filed: Jun. 29, 2000

(30) Foreign Application Priority Data

Jul. 1, 1999 (DE) .............................................. 199 30 358

(51) Int. Cl.$^7$ .................................................. H05B 37/02
(52) U.S. Cl. ......................... 315/360; 315/366; 315/399; 307/141
(58) Field of Search ..................................... 315/365, 399, 315/360; 307/10 R, 140, 141

(56) References Cited

U.S. PATENT DOCUMENTS

| | | | |
|---|---|---|---|
| 4,500,795 | * 2/1985 | Hochstein et al. | 307/141 |
| 4,638,287 | 1/1987 | Umebayashi et al. | 340/22 |
| 4,697,092 | 9/1987 | Roggendorf et al. | 307/10 R |
| 4,737,693 | * 4/1988 | Schine | 315/399 |
| 5,870,046 | 2/1999 | Scott et al. | 341/143 |

FOREIGN PATENT DOCUMENTS 19610248 9/1997 (DE) .............................. H04L/25/20

* cited by examiner

Primary Examiner—Don Wong  
Assistant Examiner—Jimmy Vu  
(74) Attorney, Agent, or Firm—Martin A. Farber

(57) ABSTRACT

A circuit arrangement for signal coupling between circuit parts having supply lines isolated from one another wherein
a) the circuit arrangement comprises a first circuit part (1) and at least one further circuit part (2), the first circuit part (1) being connected to a first supply line (3) having a first ground potential (GND1), and the other circuit part(s) (2) being connected to a supply line (4) which is different than the first supply line (3) and has an associated second ground potential (GND2), the supply line (4) or the associated line for the ground potential (GND2) being able to be connected and disconnected at least in one of these further circuit parts (2),
b) there are one or more signal paths (6, 7, 8, 9) between the first circuit part and the other circuit part(s), each of these signal paths (6, 7, 8, 9) containing a coupling capacitor (11, 12, 13, 14) for capacitively transmitting useful signals (N1, N2, N3, N4) between the first circuit part and the other circuit part(s),
c) each circuit part (1, 2) contains, on both sides of the coupling capacitors (11, 12, 13, 14), logic units (16, 17, 18, 19, 20, 21, 22, 23) for transmitting and receiving the useful signals (N1, N2, N3, N4) which are to be transmitted via the signal paths (6, 7, 8, 9),
d) at least one of the circuit parts (1 or 2) contains a clock generator (15) which outputs a clock signal (TS) to the logic units (16, 17, 18, 19, 20, 21, 22, 23),
e) a useful signal (N1, N2, N3, N4) to be transmitted is logically combined with the clock signal (TS) in the logic units (16, 17, 18, 19, 20, 21, 22, 23) both at the transmitter end and at the receiver end using an EXCLUSIVE OR function in each case.

10 Claims, 1 Drawing Sheet

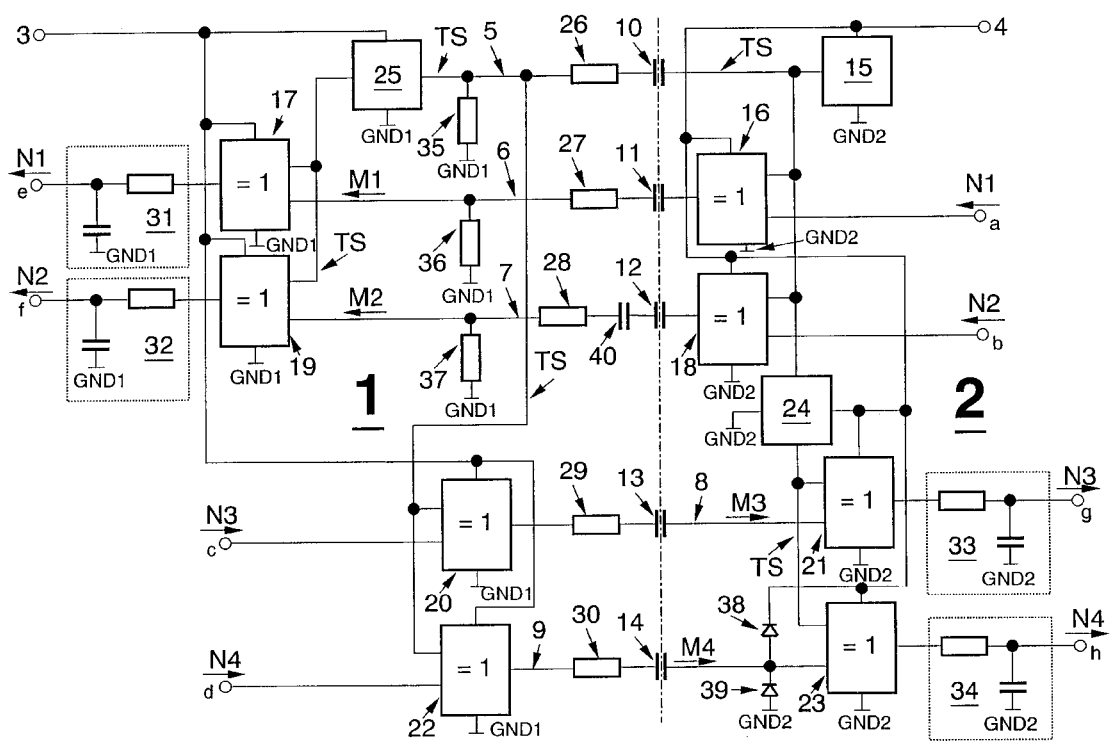

CIRCUIT ARRANGEMENT FOR SIGNAL COUPLING BETWEEN CIRCUIT PARTS HAVING SUPPLY LINES ISOLATED FROM ONE ANOTHER

FIELD AND BACKGROUND OF THE INVENTION

The invention relates to a circuit arrangement for signal coupling between circuit parts having supply lines isolated from one another, in particular for use in vehicles containing a data recording unit communicating with other vehicle devices, the data recording unit and the vehicle devices interchanging signals with it being connected using supply lines which are DC-decoupled from one another. Hence, the invention relates, in particular, to a circuit arrangement for signal coupling between ignition-linked and non-ignition-linked units and devices in a vehicle, said circuit arrangement being arranged in a data recording unit.

In a vehicle, data recording units, such as a tachograph, are connected to other vehicle devices, such as a speed sensor, a speed limiter, a combined instrument or similar units and devices for the purpose of data and signal interchange, these units and devices being able to be connected to various supply lines in order to receive their operating voltage. There is thus a continuous positive available in a vehicle, which means to say a direct supply of electrical power from the vehicle battery, or a supply of electrical power routed via fuses or current-limiting elements. Furthermore, there are supply lines which are DC-decoupled from the continuous positive and can be connected using the ignition of the vehicle and/or a main switch.

On account of its intended purpose of permanently recording driver activities and vehicle movements, a tachograph arranged in a vehicle has circuit parts connected to the continuous positive. However, it also communicates with vehicle devices whose operating voltage is connected only by actuation of the ignition and/or of the main switch, this connected operating voltage also being used to supply power to those circuit parts which, despite being arranged in the tachograph, are connected to those vehicle devices from which the tachograph receives the signals to be recorded. Hence, the tachograph contains circuit parts which are connected to different supply lines and between which signals of various nature need to be interchanged in turn in the tachograph. These signals may be static or low-frequency signals, or else dynamic signals with frequencies up into the MHz range. Furthermore, digital signals and data are increasingly also being interchanged between a tachograph and the remainder of the vehicle devices via a databus, such as a CAN bus.

Various problems result from the fact that the data recording unit, for which a tachograph has been selected here by way of example, contains circuit parts which communicate with one another and are connected to different supply lines. Thus, interference may arise during signal transmission on account of different ground potentials resulting from voltage drops along the wiring harness arranged in the vehicle. In addition, significant currents must not flow from the data recording unit to the vehicle devices connected to it, nor should such a current flow from these external devices into the data recording unit, which could occur, however, if the connectable supply lines' associated negative line, i.e. the line for the ground potential, which the voltage present on the respective supply line takes as reference, is disconnected.

To prevent these undesirable effects, optocouplers or high-value series resistors could be inserted into the signal paths, for example. However, these measures have the disadvantage that optocouplers suitable for rapid signal transmission are relatively expensive and that, if high-value series resistors were used, it would be necessary to ensure that the ground potentials of the operating voltages present in the data recording unit differ from one another only to such a small extent that the internal switching thresholds of the signal receivers arranged in the respective circuit parts are not exceeded. It is not possible to guarantee that such a condition is observed in every case under the customary operating conditions for a vehicle, however.

The object of the present invention is to demonstrate a circuit arrangement for signal coupling between circuit parts having supply lines isolated from one another, said circuit arrangement ensuring reliable, interference-free and economical transmission of static and dynamic signals under the aforementioned operating conditions.

The object is achieved by the features of the first claim. The dependent claims illustrate advantageous developments and refinements of the solution found.

The solution found is characterized by the fact that, in connection with capacitive coupling of DC-decoupled circuit parts, the signals to be transmitted are subjected to forced clocking, which also enables static and low-frequency useful signals to be transmitted via the signal paths provided with coupling capacitors. In addition, the proposed solution contains measures for stabilizing the input voltage range of the devices receiving a signal in the circuit arrangement in relation to the output voltage range of the devices transmitting a signal, in order to make reliable, interference-free and economical transmission of static and dynamic signals possible despite the rough environment prevailing in vehicles.

The solution found will now be explained in more detail with the aid of an illustrative embodiment in conjunction with the one enclosed FIGURE, which shows the basic design of the proposed circuit arrangement.

The proposed circuit arrangement for signal coupling between circuit parts having supply lines isolated from one another comprises a first circuit part 1 and at least one further circuit part 2, the first circuit part 1 being connected to a first supply line 3 having a first ground potential GND1, and the other circuit part(s) 2 being connected to a supply line 4 which is different than the first supply line 3 and has a second ground potential GND2, the supply line 4 or the associated line for the ground potential GND2 being able to be connected and disconnected at least in one of these further circuit parts 2. Thus, in the example shown, the first circuit part 1 could be connected to the continuous positive terminal of the battery in a vehicle, whereas the other circuit part 2 is supplied with current by a supply line 4 which is connected for the supply of power by actuation of the vehicle's ignition and/or of a main switch and is possibly routed via an in-phase regulator in order to stabilize it. In the figure, a dash-dotted line indicates the DC-decoupling of the two circuit parts 1 and 2. The ground potentials shown in the circuit parts 1 and 2 are generally different than one another and are therefore denoted by GND1 for the first circuit part 1, for example supplied by continuous positive, and by GND2 for the other circuit part 2. Consequently, all voltages applied to an electronic component arranged in the circuit part 1 take the ground potential GND1 as reference, whereas the same applies in relation to the ground potential GND2 for all the electronic components arranged in the circuit part 2.

Between the first circuit part 1 and the other circuit part(s) 2 there are one or more signal paths 6, 7, 8, 9. In the present example, two signal paths 6 and 7 or 8 and 9 have been respectively selected for each transmission direction between the circuit parts 1 and 2, and additionally a path 5 for the transmission of a clock signal TS, which is yet to be explained below. Each of the signal paths 6, 7, 8, 9 and the path 5 for the transmission of a clock signal TS contains a coupling capacitor 10, 11, 12, 13, 14 for capacitively transmitting signals between the first circuit part and the other circuit part(s). It is recommended that the capacitance of the coupling capacitors 10, 11, 12, 13, 14 be selected to be relatively low and that their reverse voltage be selected to be appropriately high.

In the example shown in the figure, the circuit part 2, whose supply line is intended to be connectable, that is to say is ignition-dependent, for example, contains a clock generator 15 which also supplies its clock signal TS to the first circuit part 1. This clock generator 15 can generate any desired digital AC signal. If a continuous square wave signal is selected, it is necessary to ensure that at least the phase angle, frequency or pulse width of the clock signal TS is different than that of all the useful signals N1, N2, N3, N4 to be transmitted between the circuit parts 1 and 2. The essential thing here is that the clock signal TS is not identical to the useful signals N1, N2, N3, N4 to be transmitted. In principle, the clock generator 15 could also be arranged in the circuit part 1, which is continuously supplied with current, or a clock generator could be provided in each of the two circuit parts 1 and 2. In this latter case, the clock signals, which are then independent, would also have to be transmitted from one to the other circuit part via separate paths.

In each circuit part 1 and 2, to transmit and to receive useful signals N1, N2, N3, N4 which are to be transmitted, the signal paths 6, 7, 8, 9 contain, on both sides of the coupling capacitors 11, 12, 13, 14, logic units 16, 17, 18, 19, 20, 21, 22, 23 which logically combine a useful signal N1, N2, N3, N4 to be transmitted with the clock signal TS both at the transmitter end and at the receiver end using an EXCLUSIVE OR function in each case. This means that the signal paths 6, 7, 8, 9 can also be used to transmit static and low-frequency useful signals N1, N2, N3, N4, whose time response distinguishes them in that they remain at a particular signal level at the transmitter end for such a length of time that the voltage levels would drift away in this time at the receiver end of the signal paths 6, 7, 8, 9 as a result of the time response of the coupling capacitors 11, 12, 13, 14 and the associated currents flowing through the coupling capacitors 11, 12, 13, 14; however, the invention prevents this by means of the forced clocking effected by logically combining the useful signals N1, N2, N3, N4 with the clock signal TS using the EXCLUSIVE OR function.

The useful signal N1, N2, N3 or N4, which is to be transmitted via the coupling capacitor 11, 12, 13 or 14 arranged in the signal path 6, 7, 8 or 9, is supplied to the circuit arrangement at the terminals a, b, c or d and can be removed again at the terminals e, f, g or h. As a result of the invention's logic combination of the useful signal N1, N2, N3, N4 with the clock signal TS, the supplied useful signal N1, N2, N3, N4 produces a mixed signal M1, M2, M3, M4. The transmitter-end logic units 16, 18, 20, 22 use this to encode the useful signal N1, N2, N3, N4 which is to be transmitted, and the receiver-end logic units 17, 19, 21, 23 decode it again. The horizontal arrows shown under the reference symbols N1, N2, N3, N4 and M1, M2, M3, M4 in the figure indicate the transmission direction of the signals, which then also makes it easy to see which of the logic units 16, 17, 18, 19, 20, 21, 22, 23 shown have the function of a transmitter and which have the function of a receiver.

The clock generator 15 and the receiver-end logic units 17, 19, 21, 23 are preferably connected to one another in the two circuit parts 1 and 2 by means of a matching device 24 and 25, respectively, in order to match the timing of the clock signal TS supplied to the receiver-end logic units 17, 19, 21, 23 to the extent by which the mixed signals M1, M2, M3, M4 transmitted via the signal paths 6, 7, 8, 9 are delayed in the transmitter-end logic units 16, 18, 20, 22.

To limit the current flowing in the signal paths 6, 7, 8, 9 and the current flowing in the path 5 for the clock signal TS, it is advantageous to arrange a resistor 26, 27, 28, 29, 30 in series with each of the coupling capacitors 10, 11, 12, 13, 14. Such an undesirable flow of current is produced, by way of example, when the supply line 4 or the line for the associated ground potential GND2 is switched on or off in the circuit part 2. In order to prevent a DC-coupled flow of current also in the event of a fault when one of the coupling capacitors 10, 11, 12, 13 or 14 is shorted, a further capacitor can be connected in series with each of the coupling capacitors 10, 11, 12, 13, 14 for this purpose, as shown by way of example in the figure by the capacitor 40 in the signal path 7.

For the design of the proposed circuit arrangement, it has been found to be worthwhile to produce the logic units 16, 17, 18, 19, 20, 21, 22, 23 using HCMOS gates, because these are able to give a reliable interpretation of the mixed signals M1, M2, M3, M4 transmitted via the signal paths 6, 7, 8, 9 under the operating conditions usually prevailing in a vehicle. Such gates have high-impedance signal inputs and input circuitry which is suitable for the application instance addressed.

To prevent malfunctions in the logic units 17 and 19, which are arranged in the first circuit part 1 and are therefore continuously supplied with current, and in the matching device 25, it is recommended that the receiver-end logic units 17 and 19, situated in this circuit part 1, and the matching device 25, which is possibly also provided there, each be provided with a resistor 35, 36, 37 which fixes that input of the logic unit 17 and 19 and of the matching device 25 which is connected to the coupling capacitor 10, 11, 12—as shown in the figure—with respect to the ground potential GND1. Alternatively, the input of the logic unit 17 and 19 and of the matching device 25 could also be fixed with respect to the supply voltage in this circuit part 1, however. The voltage levels present at the inputs of the aforementioned logic units 17 and 19 and of the matching device 25 should not be in the analog intermediate range of the HCMOS gates if such logic units are used to implement the circuit arrangement proposed in this case, because otherwise undesirable effects can arise on HCMOS gates, such as oscillations at the output thereof and increased current consumption. Instead of fixing the voltage levels at the input of the HCMOS gates using resistors 35, 36, 37, Schmitt triggers can also be connected upstream of the inputs of the HCMOS gates.

To permit correct signal transmission between the circuit parts 1 and 2, it is necessary to ensure that the potentials of the mixed signals M1, M2, M3, M4 transmitted via a coupling capacitor 11, 12, 13, 14, or the potential of the clock signal TS transmitted via the coupling capacitor 10, do not exceed or fall below the input voltage range in which the receiver-end logic units 17, 19, 21, 23 or the matching device 25 are able to evaluate a signal. If the potential of a transmitted signal threatens to exceed the upper limit value of the input voltage range, the otherwise high-impedance input of the logic unit 17, 19, 21, 23 or that of the matching device 25 becomes conductive, with the result that a current flows into this input. If the potential of a transmitted signal threatens to fall below the lower limit value of the input voltage range, the otherwise high-impedance input of the logic unit 17, 19, 21, 23 or that of the matching device 25 becomes conductive, with the result that a current flows out of this input. This function can be implemented, by way of example, by a diode network connected upstream of the input of the logic unit or of the matching device 25 or by a diode network integrated in the logic unit or in the matching device 25. In the example shown in the signal path 9 in the figure, the diode network comprising the two diodes 38 and 39 results in a defined distance between the limit values of the input voltage range and the ground potential GND2 and between the limit values of the input voltage range and the potential of the supply line 4. It goes without saying that the output voltage swing of the transmitter-end logic units 16, 18, 20, 22 and that of the clock generator 15 is tuned to the input voltage range of the receiver-end logic units 17, 19, 21, 23 and to that of the matching device 25. In the steady state, the potential difference between the ground potentials GND1 and GND2 concerned is present across the coupling capacitors 10, 11, 12, 13, 14.

The clock signal TS is generally in the form of a square wave signal. In this context, the frequency of the clock signal TS is selected to be so high that the clock period of the clock signal TS is significantly shorter than those time constants produced for those currents flowing in or out at the signal inputs of the receiver-end logic units 17, 19, 21, 23 and at the signal input of the matching device 25. This stipulation for the frequency of the clock signal TS is met so that the voltage levels generated by the transmitted signals at the receiver end, the path 5 of the clock signal TS and the signal paths 6, 7, 8, 9 cannot be impaired by the aforementioned time constants. In the path 5 for transmitting the clock signal TS and in the signal paths 6 and 7, the time constants are essentially formed in association with the coupling capacitors 10, 11, 12 and the resistors 35, 36, 37 arranged at the receiver end. In the signal paths 8 and 9, the respective time constants are produced from the capacitance of the coupling capacitors 13, 14 and the internal input circuitry of the associated logic units 21, 23.

Signal delay tolerances between the transmitter-end logic units 16, 18, 20, 22 and the receiver-end logic units 17, 19, 21, 23 may result in needle pulses in the nanosecond or subnanosecond range. If these needle pulses cannot be tolerated for certain applications, they can be eliminated by supplying the output signal from the receiver-end logic units 17, 19, 21, 23 to a respective RC filter 31, 32, 33, 34, which are each shown inside a dotted border in the figure.

What is claimed is:

1. A circuit arrangement for signal coupling between circuit parts having supply lines isolated from one another, wherein
   a) the circuit arrangement comprises a first circuit part (1) and at least one further circuit part (2), the first circuit part (1) being connected to a first supply line (3) having a first ground potential (GND1), and the other further circuit part(s) (2) being connected to a supply line (4) which is different than the first supply line (3) and has an associated second ground potential (GND2), the supply line (4) or the associated line for the ground potential (GND2) being connectable and disconnectable at least in one of said further circuit parts (2),
   b) there are one or more signal paths (6, 7, 8, 9) between the first circuit part (1) and the other further circuit part(s) (2), each of said signal paths (6, 7, 8, 9) containing a coupling capacitor (11, 12, 13, 14) for capacitively transmitting useful signals (N1, N2, N3, N4) between the first circuit part and the other circuit part(s),
   c) each said circuit part (1, 2) contains, on both sides of the coupling capacitors (11, 12, 13, 14), logic units (16, 17, 18, 19, 20, 21, 22, 23) for transmitting and receiving the useful signals (N1, N2, N3, N4) which are to be transmitted via the signal paths (6, 7, 8, 9),
   d) at least one of the circuit parts (1 or 2) contains a clock generator (15) which outputs a clock signal (TS) to the logic units (16, 17, 18, 19, 20, 21, 22, 23), and
   e) a useful signal (N1, N2, N3, N4) to be transmitted being logically combined with the clock signal (TS) in the logic units (16, 17, 18, 19, 20, 21, 22, 23) both at transmitter end and at receiver end using an EXCLUSIVE OR function in each case.

2. The circuit arrangement as claimed in claim 1, wherein only one of the circuit parts (1 or 2) contains a clock generator (15), wherein the clock signal (TS) is transmitted from one further circuit part (2) to the first circuit part (1) via a dedicated path (5) and a coupling capacitor (10) situated therein.

3. The circuit arrangement as claimed in claim 1, wherein at least phase angle, frequency or pulse width of the clock signal (TS) is different than that of the useful signals (N1, N2, N3, N4) to be transmitted.

4. The circuit arrangement as claimed in claim 1, wherein the clock signal (TS) is in form of a square wave signal.

5. The circuit arrangement as claimed in claim 1, wherein the clock generator (15) and the receiver-end logic units (17, 19, 21, 23) are connected to one another by a matching device (24 and 25, respectively) in order to match timing of the clock signal (TS) supplied to the receiver-end logic units (17, 19, 21, 23) to the extent by which mixed signals (M1, M2, M3, M4) which comprise the useful signal (N1, N2, N3, N4) and the clock signal (TS) and are transmitted via the signal paths (6, 7, 8, 9) are delayed in the transmitter-end logic units (16, 18, 20, 22).

6. The circuit arrangement as claimed in claim 5, wherein clock cycle of the clock signal (TS) is shorter in duration than time constant for those currents flowing via the coupling capacitors (10, 11, 12, 13, 14) into signal inputs of the receiver-end logic units (17, 19, 21, 23) and into signal input of the matching device (25), or flowing out thereof.

7. The circuit arrangement as claimed in claim 1, wherein the signal paths (6, 7, 8, 9) or a path (5) for the clock signal (TS) contain(s) a current-limiting resistor (26, 27, 28, 29, 30) or a further capacitor (40) or both in series with the respective coupling capacitor (10, 11, 12, 13, 14).

8. The circuit arrangement as claimed in claim 1, wherein output signal from a receiver-end logic unit (17, 19, 21, 23) is supplied to an RC filter (31, 32, 33, 34).

9. The circuit arrangement as claimed in claim 1, wherein said circuit part (1) which is continuously supplied with current contains, for the receiver-end logic units (17, 19) and a matching device (25), which is providable there, a respective resistor (35, 36, 37) or a Schmitt trigger which fixes the voltage level at that input of the logic unit (17, 19) and of the matching device (25) which is connected to the coupling capacitor (10, 11, 12).

10. The circuit arrangement as claimed in claim 5, wherein connected to input of the receiver-end logic units (17, 19, 21, 23) and to input of the matching device (25), there is either a diode network (38, 39) connected upstream of the respective input or a diode network which is integrated in the relevant logic unit and in the matching device (25), said diode network ensuring that the potentials of the mixed signals (M1, M2, M3, M4) transmitted via a coupling capacitor (11, 12, 13, 14) or the potential of the clock signal (TS) transmitted via the coupling capacitor (10) do not exceed or fall below input voltage range in which the receiver-end logic units (17, 19, 21, 23) or the matching device (25) are able to evaluate a signal.

* * * * *